Dec. 1, 1970   K. M. KNAPP ET AL   3,543,324

PIPELINE PIG AND ASSOCIATED APPARATUS

Filed June 2, 1969

Kenneth M. Knapp
Mary M. Knapp
INVENTORS

BY *Donald Gunn*

ATTORNEY

United States Patent Office 3,543,324
Patented Dec. 1, 1970

3,543,324
PIPELINE PIG AND ASSOCIATED APPARATUS
Kenneth M. Knapp and Mary M. Knapp, both of 1209 Hardy, Houston, Tex. 77020
Filed June 2, 1969, Ser. No. 829,496
Int. Cl. B08b 9/04
U.S. Cl. 15—104.06                                5 Claims

ABSTRACT OF THE DISCLOSURE

A pipeline pig for cleaning the interior of a pipeline which incorporates preferably a round spherical body having a diameter somewhat larger than the inside diameter of the pipeline, and being formed of a material with an open cell structure to thereby avoid pressure differentials within the pig. The associated apparatus further incorporates an extension on the pipeline having a number of pigs at rest therein, there being a barrier for holding the pigs in the extension for release to flow in the pipeline as the pigs are dropped from the extension into the pipeline.

SUMMARY OF PROBLEM AND SOLUTION

Pipeline pigs heretofore introduced have been susceptible to problems of pressure equalization in the pig. For instance, inflatable pigs having a bladder require inflation to equalize the pressure and to maintain the pig at a desired diameter, size and shape to obtain the needed wiping and cleaning characteristics while the pig passes through the pipeline. The apparatus of the present invention is a pipeline pig which is useable in any pressure environment within a pipeline, and is summarized as including a preferably spherical pig having an outside diameter which is somewhat greater than the inside diameter of the pipeline, and being formed of an open cell foamed plastic body to permit fluid communication therethrough, and especially to permit pressure equalization internally of the pig. The apparatus further includes an extension on the pipeline for storing a number of pigs which can be fed sequentially into the pipeline on release by a gate or barrier in the extension.

Figure 1:
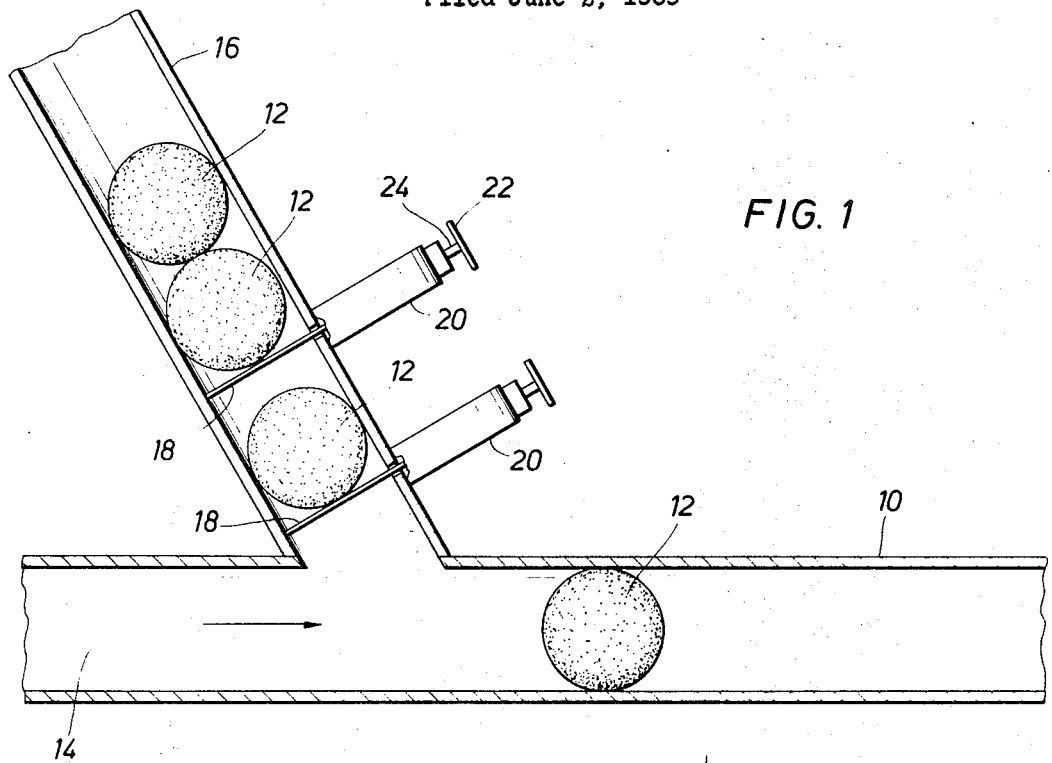
Figure 2:
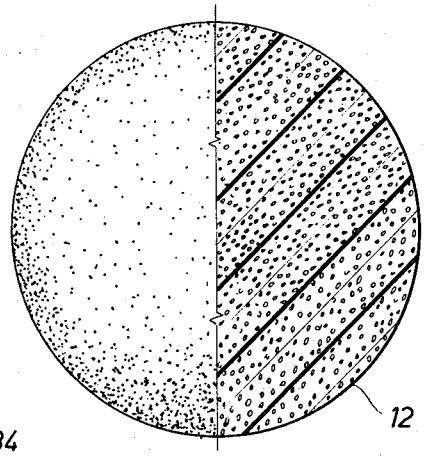
Figure 3:
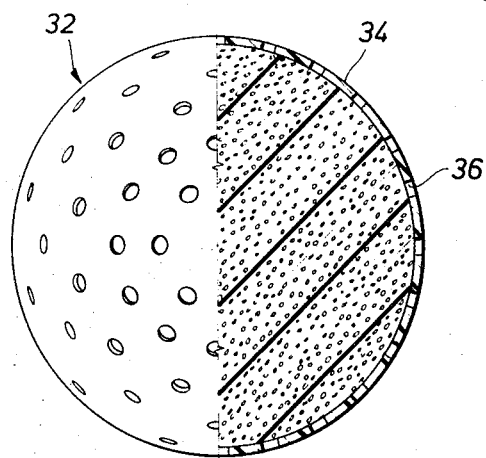

Many objects and advantages of the present invention will become more readily apparent from a consideration of the included specification and drawings, wherein:

FIG. 1 illustrates the pig of the present invention in a pipeline, and further includes an extension on the pipeline for storing a number of pigs which can be controllably added to the pipeline;

FIG. 2 is a view of the pig of the present invention, partly in section, illustrating the open cell structure thereof; and, FIG. 3 is a view similar to FIG. 2 of an alternative embodiment of the present invention showing a hardened skin on the pig with a number of openings therein communicating with the interior to maintain the open cell structure whereby pressure equalization across the pig is obtained.

Attention is first directed to FIG. 1 which includes a pipeline indicated by the numeral 10 with a pig 12 being forced therethrough by the fluid flow 14. The pipeline 10 is of indefinite length and has a nominal diameter ranging from relatively modest diameters to perhaps as much as three feet in diameter or greater. The pipeline 10 is of indefinite length and may be from a few miles in length to several hundred miles in length. The pipeline 10 typically extends cross country and communicates the pressure fluid 14 from one location to another. Routinely, the pressure fluid is a petrochemical product and is pumped through the pipeline at pressures ranging from perhaps 500 to perhaps 1500 p.s.i. The pig 12 is carried through the pipeline and cleans the side walls of the pipe to increase the effective or net cross sectional area and hence the flow through the pipeline. Moreover, the present invention provides a pig which permits pressure equalization in the pig to thereby avoid the need for inflation of a bladder or the like or the fabrication of a structure which withstands such pressure differentials. The pig 12 has an open cell structure which obtains pressure equalization at all points within the pig and immediately exterior thereto so that the pig maintains the desired size and shape in the pipeline without regard to the pressure. In further particular, the pig is moved through the pipeline by the flow which thereby forces the pig from the point of induction into the pipeline to a point of removal downstream.

In FIG. 1, the numeral 16 indicates an extension to the pipeline 10. The extension 16 is preferably formed of the same nominal diameter pipe which forms the pipeline 10. The extension 16 may be located at the point of origin of the pipeline, or at various pump houses along the way. The extension 16 preferably extends above the pipeline 10 to permit gravity induction of the pipeline pigs 12 which are stored in the extension 16. While the drawings show three pigs in the extension, it will be appreciated that the extension is indefinite in length, and hence, may store any number of pigs. Moreover, a storage container or hopper may be used in conjunction with the extension to feed a large number of pigs into the pipeline should this be desired.

While it is not mandatory to utilize gravity feed for the extension 16, preferably the extension does extend upwardly with respect to the horizontal plane of the pipeline 10. It need not be vertically erect, and is preferably angled somewhat in the manner shown in the drawing to smoothly carry the pigs into the pipeline and to avoid turning an abrupt corner when the pigs enter the pipeline. The preferred embodiment incorporates a gate or barrier 18 adjacent the first pig in the extension 16, there being a sealed chamber 20 for withdrawing and receiving the gate 18. A handle 22 on a suitable push rod 24 which is connected with the gate 18 provides a means of withdrawal of the gate to thereby permit a pig to enter the pipeline. In the preferred embodiment, the gate 18 need not fully close off the extension 16. Thus, the gate 18 may be a single member extending approximately across a diameter of the extension 16 to capture the pig in the illustrated position. Moreover, bar stock, tubular members, or any other shape member may serve as the barrier or gate means 18 to hold the pig 12 in position.

As shown in the drawings, the gate means 18 is duplicated at various locations along the extension 16. Preferably, the gates 18 are spaced sufficiently from one another to permit a desired number of pigs to be captured between two adjacent gates 18. In the embodiment of FIG. 1, the two gates are sufficiently spaced to capture only one pig between them. Clearly, they could be twice the distance apart, and hence capture two pigs therebetween. In the embodiment shown, the gates may be duplicated along the full length of the extension 16, or may be found at only one location along the extension 16, dependent on the particular design criteria of the extension 16. The gates may be hand operated inasmuch as there is very little loading on the gate structure.

Attention is next directed to FIG. 2 where the pig 12 is illustrated in greater detail. Preferably, the pig 12 is formed of high density foamed polyurethane, the density being in the range of perhaps twenty to forty pounds per cubic foot. The lower limit is determined in part by the need of structural material and the upper limit is in part one of economics. It is provided with an open cell structure in foaming. While other olefins may be used in the fabrication of the plastic body, polyurathane has been found most acceptable to date.

Numerous foaming agents are known for plastic, and include the several Freon constituents commercially available, carbon dioxide evolving agents, and the like.

Attention is next directed to FIG. 3 which shows an alternative embodiment of the pig of the present invention which is indicated by the numeral 32. The pig 32 is similar to the pig 12 in the inclusion of an open cell foamed plastic body. The skin 34 is perforated at a number of openings 36 to provide communication through the skin 34. The skin 34 preferably has a very small quantity of bubbles entrapped therein, and more nearly resembles a solid plastic member. However, it is preferably of the same material comprising the greater bulk of the pig 32 except that it is of higher density. Consequently, it is somewhat arbitrary to draw a distinct interface between the two materials inasmuch as they are really the same material, but vary only in density. The utilization of much higher density material as the skin provides a tougher wearing surface on the pig. It will be appreciated that the pig tumbles at random as it passes through the pipe 10, and hence, is abraded on all exterior surfaces. The inclusion of the tougher skin on the surface provides a protective coating which extends the life of the pig. The holes 36 communicating with the interior where the lighter foamed material is found still permit fluid communications into and through the pig whereby the pressure equalization of the pig is obtained.

Relatively speaking, the skin 34 need not exceed one inch in thickness as a matter of economics, and, as noted before, it is, in reality, a zone of greater density plastic material so that its actual measurement is somewhat difficult to even state. However, nominal thicknesses in the range of one-quarter to perhaps three-quarters thickness have been found suitable for the present invention.

Preferably, the pig 12 is in the range of five to ten percent larger in diameter than the inside diameter of the pipeline 10. The pig 32 is larger by approximately the same percentage. If the pig is within one or two percent of the diameter of the pipeline 10, it maintains only a narrow line of contact rather than achieving a wide band of contact against the pipeline 10. Consequently, an increase to perhaps five or ten percent over the inside diameter of the pipeline 10 is considered optimum. If the pig is perhaps fifteen or twenty percent oversized, there is some difficulty in forcing it through the pipeline, and hence, such large sizes are not normally considered optimum.

In operation, the pig 12 is shown in FIG. 1 as being slightly compressed and having a zone or band of contact about its periphery against the pipeline 10. The band of contact provides a wiping service which removes deposits and residue found on the side wall of the pipeline. Also, the pig forces accumulated liquids from the low portions of gas lines. This increases the effective cross sectional area of the pipeline, and will increase the net volume flowing through the pipeline 10. As the pig moves through the pipeline, it rolls and tumbles and wipes the side walls clean, and forces the material, liquid and paraffin out the pipeline. The pressure equalization in the pig of the present invention is particularly important. The dynamics of the fluid flow in the pipeline are relied upon to provide the motivating force for the pig. However, the pig of the present invention can be used for pipelines of any operating pressure without special provisions, and therefore, the pig has been found particularly useful in this regard.

The foregoing has described the preferred embodiment of the present invention, and the terminology used herein is extended to the claims which are appended hereto.

What is claimed is:

1. A pig adapted to be pumped through a pipeline which is susceptible of deposits, residue, and other accumulations next to the inner diameter, which comprises a body, a cross section therethrough being approximately circular, and being formed of a foamed plastic mass having an open cell structure, and having a skin which covers the foamed plastic mass substantially on the exterior portion thereof with sufficient opening means therein to communicate with said plastic mass, said plastic mass and said skin being formed of the same plastic materials with said skin being of higher density to provide a tougher abrasion resistant surface means in comparison with said plastic mass, said skin and said plastic mass being integrally formed in such a manner that said skin density decreases toward the central portions of said pipeline pig and said skin and said plastic mass have an ill-defined interface.

2. The invention of claim 1 wherein said pig is approximately spherical and has a nominal diameter which is greater than the inside diameter of the pipeline.

3. The invention of claim 1 wherein said pig is formed of a foamed polyolefin plastic mass.

4. The invention of claim 1 wherein said foamed plastic mass has a density of approximately twenty to forty pounds per cubic foot.

5. The invention of claim 1 wherein said plastic material is polyurethane.

References Cited

UNITED STATES PATENTS

| | | | |
|---|---|---|---|
| 2,906,650 | 9/1959 | Wheaton | 15—104.06 X |
| 3,011,197 | 12/1961 | Nehse et al. | 15—104.06 |
| 3,276,061 | 10/1966 | Ver Nooy | 15—104.06 |

EDWARD L. ROBERTS, Primary Examiner